(12) United States Patent
Orsborn et al.

(10) Patent No.: US 6,928,802 B1
(45) Date of Patent: Aug. 16, 2005

(54) COMPACTOR STRUCTURE FOR FORMING A CROWN ON THE TOP OF A COMPACTED COTTON MODULE

(75) Inventors: Jesse H. Orsborn, Port Byron, IL (US); Michael J. Covington, Bettendorf, IA (US)

(73) Assignee: CNH America LLC, Racine, WI (US)

( * ) Notice: Subject to any disclaimer, the term of this patent is extended or adjusted under 35 U.S.C. 154(b) by 39 days.

(21) Appl. No.: 10/877,574

(22) Filed: Jun. 25, 2004

(51) Int. Cl.$^7$ ............................................. A01D 46/08
(52) U.S. Cl. ............................................. 56/28; 460/8
(58) Field of Search ..................... 56/16.6, 28, 30, 56/344; 460/8, 114; 298/1 B; 414/502, 505, 414/525.1

(56) References Cited

U.S. PATENT DOCUMENTS

| | | | |
|---|---|---|---|
| 3,215,291 A * | 11/1965 | Nickla | 414/525.1 |
| 3,556,327 A | 1/1971 | Garrison | 214/522 |
| 3,691,741 A | 9/1972 | White et al. | 56/344 |
| 3,720,052 A | 3/1973 | Anderson et al. | 56/346 |
| 3,754,388 A | 8/1973 | Neely, Jr. | 56/346 |
| 3,839,852 A | 10/1974 | Jebens | 56/346 |
| 4,553,378 A | 11/1985 | Fachini et al. | 56/16.6 |
| 4,635,544 A | 1/1987 | Taylor | 100/98 R |
| 4,888,940 A | 12/1989 | Deutsch | 56/16.6 |
| 4,930,297 A | 6/1990 | Schlueter et al. | 56/16.6 |
| 4,958,756 A | 9/1990 | Conway | 222/164 |
| 5,343,679 A | 9/1994 | Cymara | 56/16.6 |
| 5,407,390 A * | 4/1995 | Carney et al. | 460/119 |
| 5,533,932 A * | 7/1996 | Covington et al. | 460/119 |
| 5,584,762 A | 12/1996 | Buhler et al. | 460/119 |
| 6,530,199 B1 * | 3/2003 | Covington et al. | 56/16.6 |
| 6,536,197 B1 | 3/2003 | Covington et al. | 56/28 |

* cited by examiner

*Primary Examiner*—Árpád Fábián Kovács
(74) *Attorney, Agent, or Firm*—Brant T. Maurer; Rebecca Henkel

(57) ABSTRACT

Cotton compacting structure for distributing and compacting cotton within a cotton compactor chamber of a cotton module builder or packager, including a frame adapted to be supported in the chamber for downward movement against cotton collected in a lower portion of the chamber for compacting the cotton therein into a cotton module or package, the frame including a plurality of elongate cotton compactor members disposed in a longitudinally extending concave array defining a downwardly facing cavity. The cotton compactor members include at least one center compactor member defining a longitudinally extending highest region of the cavity and compactor members spaced from the center compactor member defining lower regions of the cavity. At least some of the cotton compactor members include augers rotatable for moving cotton downwardly through the frame and in at least one longitudinal direction beneath the frame.

18 Claims, 9 Drawing Sheets

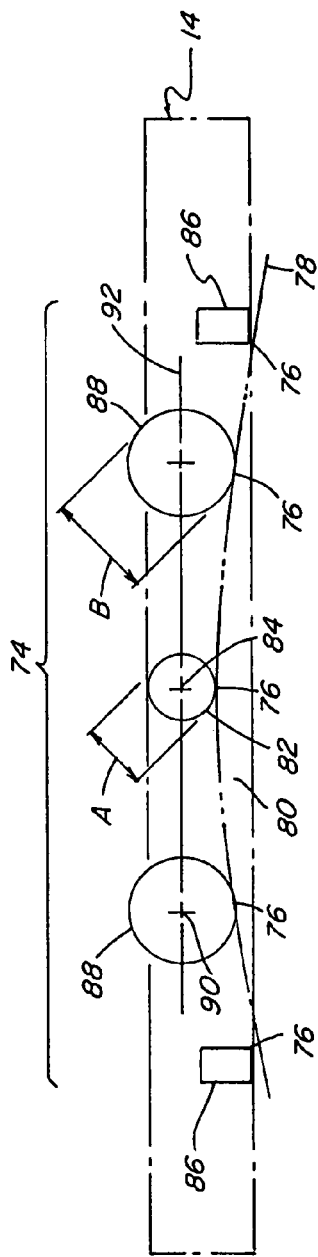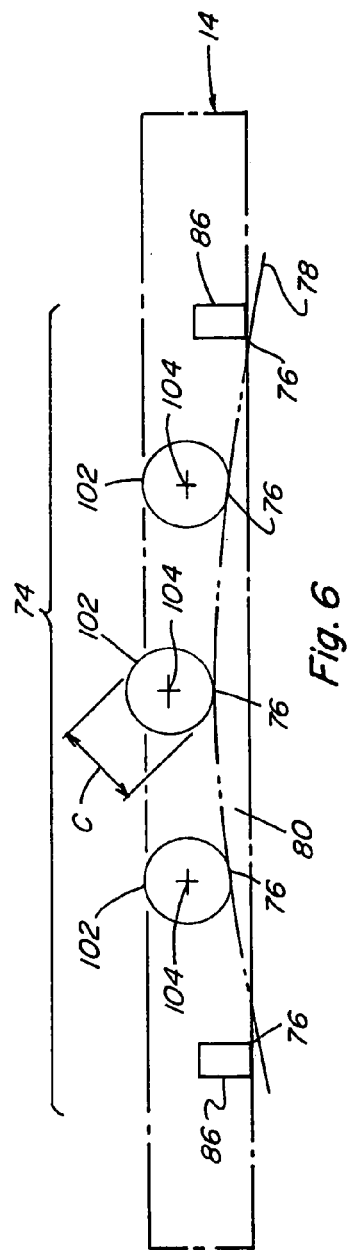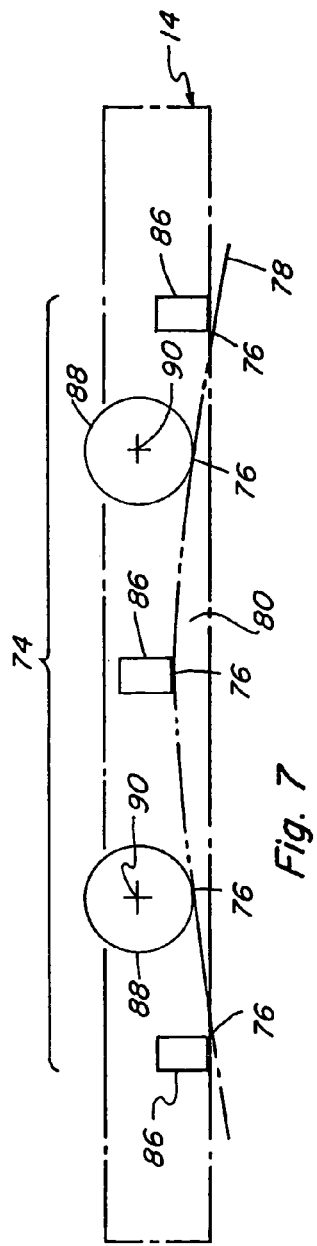

COMPACTOR STRUCTURE FOR FORMING A CROWN ON THE TOP OF A COMPACTED COTTON MODULE

TECHNICAL FIELD

This invention relates generally to compactor structure for compacting and building a cotton module, and more particularly, to compactor structure having features for distributing cotton within a cotton module builder chamber and compacting the cotton to form a module top having a crown shape for better shedding water.

BACKGROUND ART

On a cotton harvester having an onboard cotton module builder, also known as a cotton packager, the module or cotton package is formed by a compactor structure that moves in a vertical direction within a module builder or cotton compactor chamber, thereby pressing and compacting the cotton beneath the compactor structure against the chamber floor structure. Typically, augers on the compactor structure distribute the cotton within the compactor chamber and also act as compactor members for applying downward force against the cotton beneath the compactor structure when the compactor structure moves vertically down within the chamber. This results in a generally rectangular shape free-standing module of compacted cotton when subsequently unloaded onto the ground or another surface. Also typically, once unloaded, the top of the module is covered with a canvas or film tarp or cover. This is to prevent water from collecting on the module from rain or condensation prior to processing by a cotton gin. Cotton gins typically cannot process the cotton if the cotton is too high in moisture content. Recent advances in cotton compactor technology have provided the capability to densely pack the cotton, such that the module can substantially retain the shape of the module builder or compactor chamber, and such that the sides of the module will have a density that will shed water. However, it has been found that compactor structures having a flat shape will produce a module which is correspondingly flat on top. As a result, water can collect or pool on the module top, and there is a danger that even if covered, the water can seep or leak through the tarp or cover, to cause problems including a high moisture content, mold, or, if the moisture reaches the interior, heat buildup in the module.

Thus, what is sought is compactor structure for a cotton module builder capable of densely compacting the cotton, yet which overcomes one or more of the problems or shortcomings set forth above.

SUMMARY OF THE INVENTION

What is disclosed is several embodiments of cotton compacting structure for distributing and compacting cotton within a cotton compactor chamber of a cotton module builder or packager, having the capabilities and which overcomes the problems and shortcomings set forth above. According to a preferred aspect of the invention the compactor structure of the invention includes a frame adapted to be supported in the chamber for downward movement against cotton collected in a lower portion of the chamber for compacting the cotton therein into a cotton module or package, the frame including a plurality of elongate cotton compactor members disposed in a longitudinally extending concave array defining a downwardly facing cavity, the cotton compactor members including at least one center compactor member defining a longitudinally extending highest region of the cavity and compactor members spaced from the center compactor member defining lower regions of the cavity, and at least some of the cotton compactor members comprising augers rotatable for moving cotton downwardly through the frame and in at least one longitudinal direction beneath the frame. The compactor members preferably include side members which cooperate with sides of the chamber for densely compacting and forming distinct side peripheral edges of the top of the module. The augers preferably include augers located both vertically and horizontally between or intermediate the side compactor members and the center compactor member. The center compactor member can be an auger or a beam. If the center compactor member is an auger, it can have a helical flight or flights having the same diametrical extent as the other augers and be mounted higher, or it can have smaller diameter flights and be mounted at the same height, so as to have portions which contact and compact the cotton which are higher than those of the others of the augers, for forming the crown on the top of the cotton module.

BRIEF DESCRIPTION OF THE DRAWINGS

FIG. 5 is a simplified schematic end view of the compactor structure of FIGS. 1 and 4, showing the relative positions of the cotton compactor members thereof;

FIG. 6 is a simplified schematic end view of an alternative compactor structure of the invention for forming a crown on a cotton module;

FIG. 7 is a simplified schematic end view of another alternative compactor structure of the invention;

DETAILED DESCRIPTION OF THE INVENTION

Figure 1:
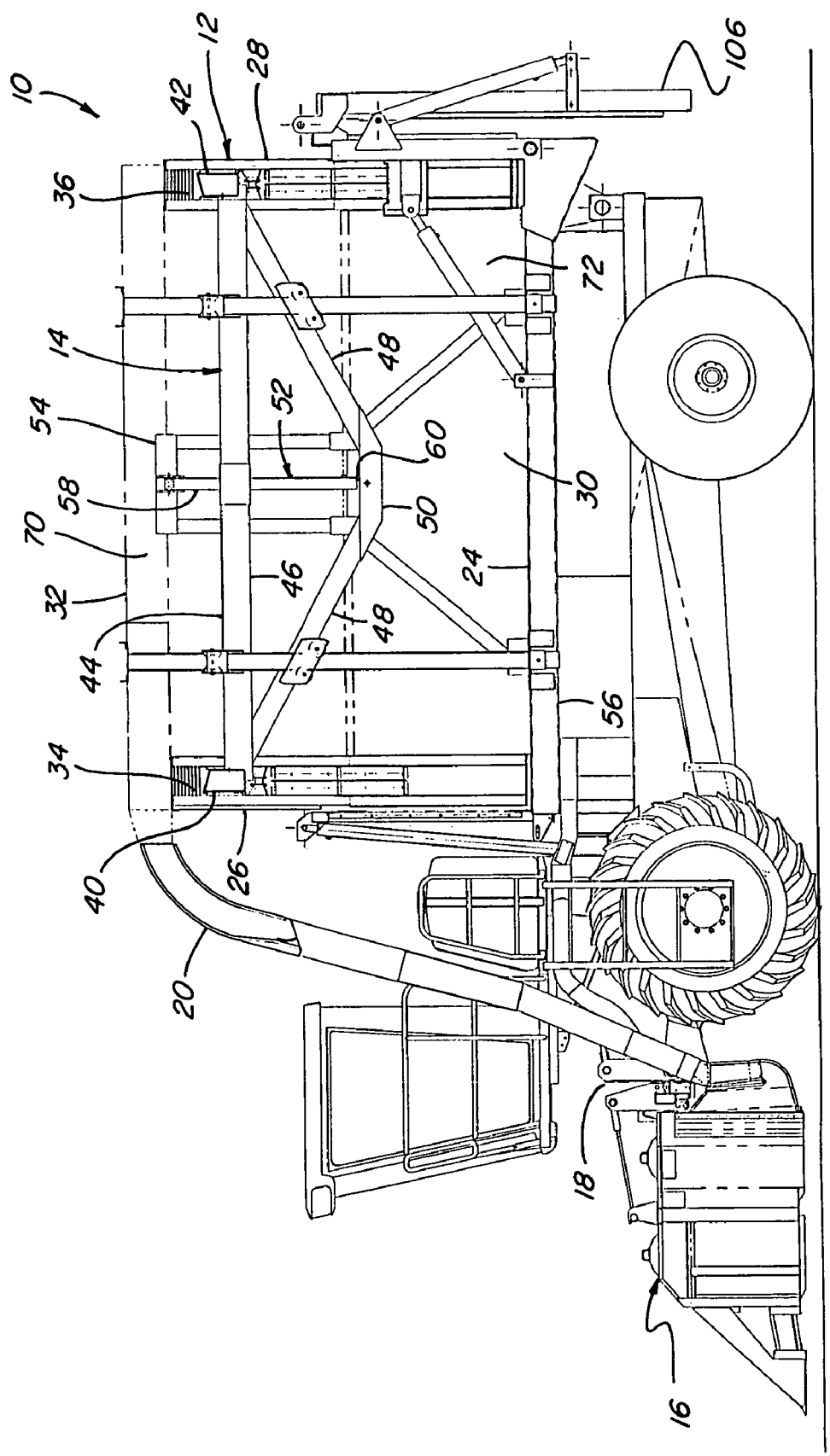
FIG. 1 is a side view of a cotton harvesting machine having an on-board cotton module builder including compactor structure according to the present invention for forming a compacted cotton module having a crown on a top surface thereof, the compactor structure being shown in a raised position.
Figure 2:
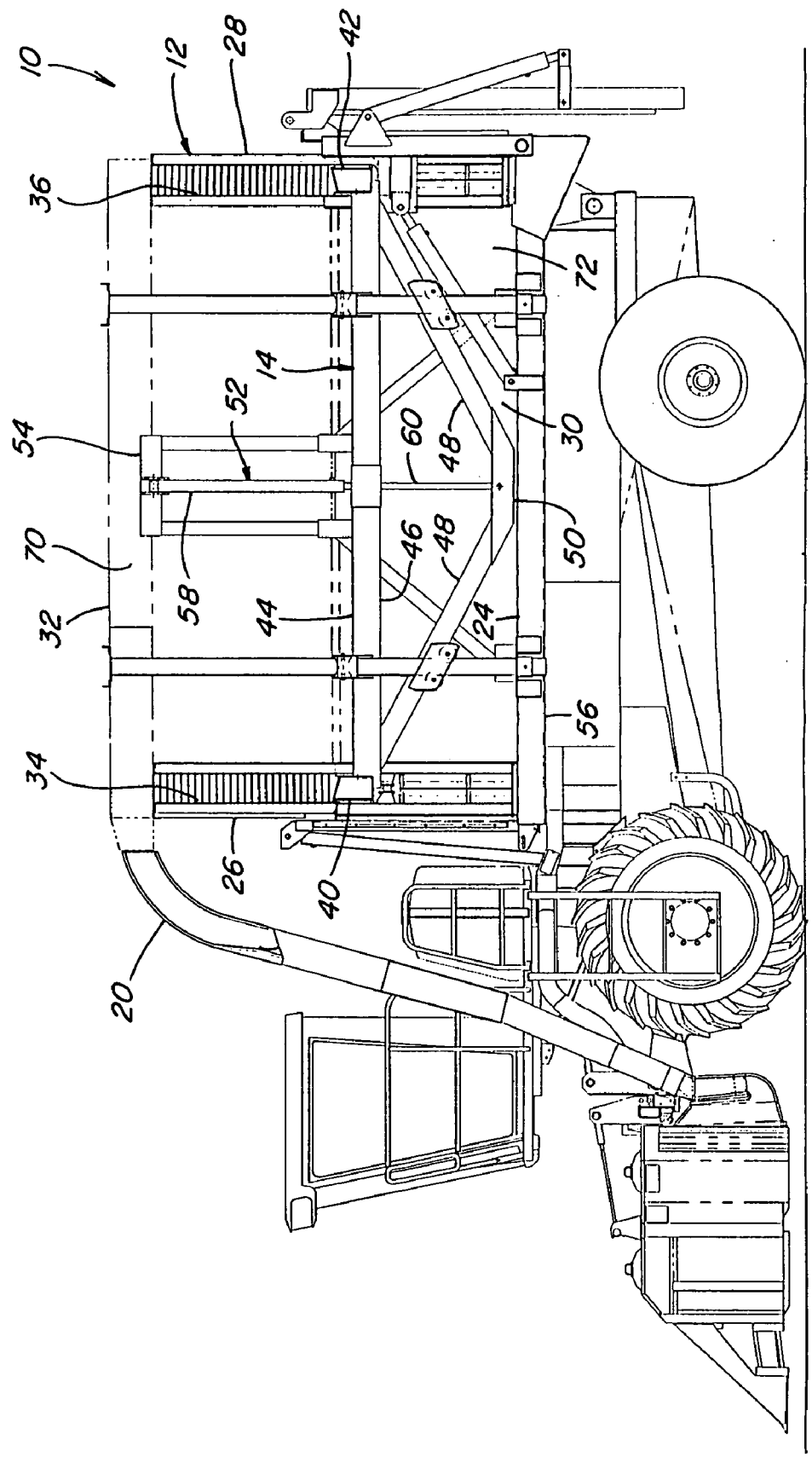
FIG. 2 is another enlarged fragmentary side view of the harvesting machine of FIG. 1 showing the compactor structure in a lowered, compacting position.
Figure 3:
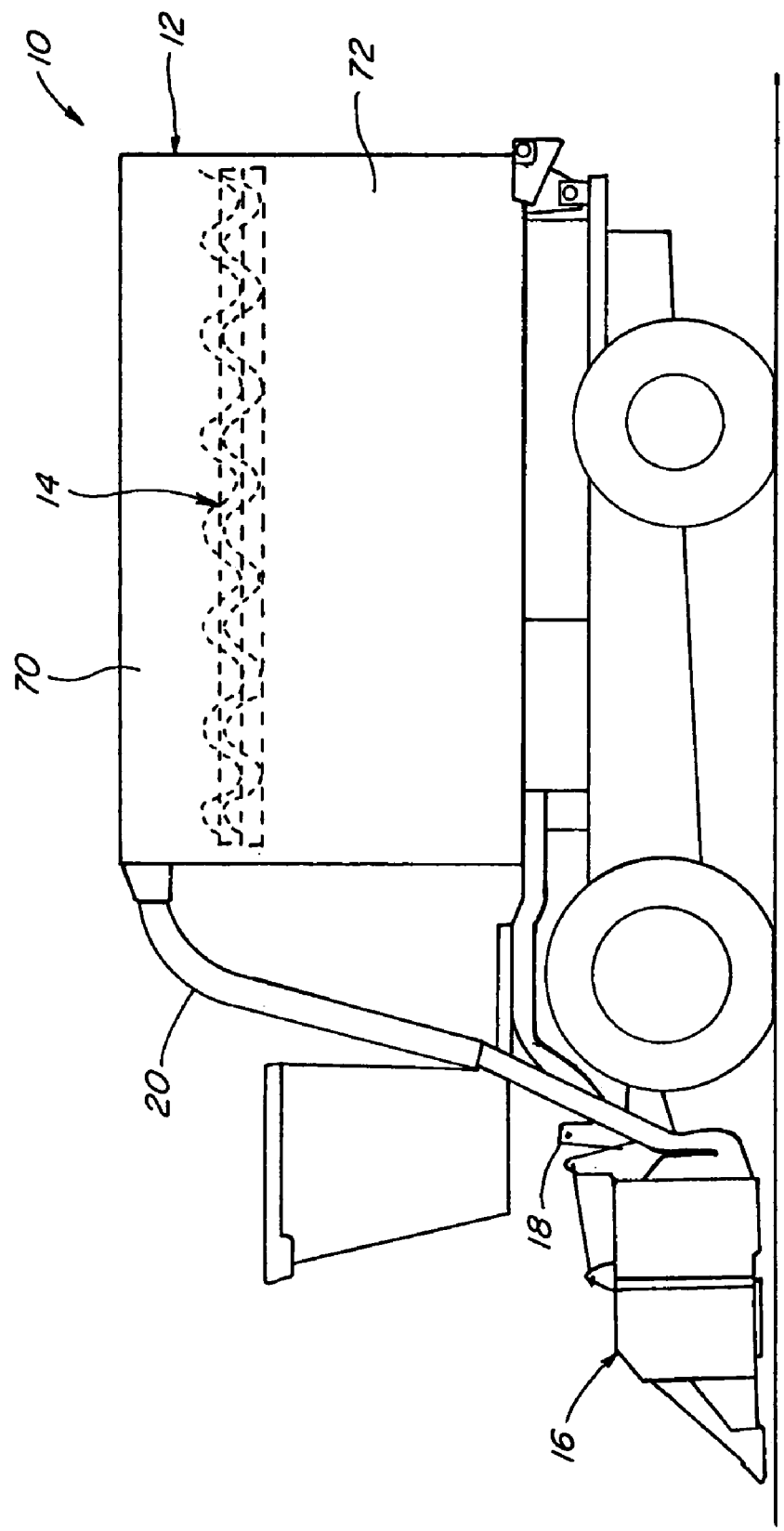
FIG. 3 is a simplified schematic side view of the harvesting machine showing the compactor structure in dotted lines and showing compactor members of the compactor structure.

Referring now to the drawings, in FIGS. 1, 2 and 3, a cotton harvesting machine 10 is shown, including an on-board cotton module builder 12, including a compactor structure 14 constructed and operable according to the teachings of the present invention for compacting and building a cotton module having a top surface including a crown for shedding moisture. Generally, cotton harvesting machine 10 is self-propelled for movement over a field of cotton plants, and includes a plurality of cotton harvesting units 16 extending in a side-by-side array across a front end 18 of machine 10. Cotton harvested by harvesting units 16 is conveyed by flows of air through ducts 20 which extend rearwardly and upwardly from harvesting units 16 to an upper region of a cotton compacting chamber 22 (FIGS. 8, 9 and 10) of module builder 12, in the well known conventional manner. The cotton conveyed into cotton compacting chamber 22 will then collect on a floor 24 within chamber 22, against which the cotton will be compacted by compactor structure 14, as will be explained.

Cotton compacting chamber 22 is a four-sided cavity defined on the bottom by floor 24 and upwardly extending opposing front and rear end walls 26 and 28, and side walls, represented by side wall 30, extending therebetween. Walls 26, 28 and 30 typically include openings or perforations therethrough, to allow passage and dissipation of the air used to convey the cotton into chamber 22, while retaining the cotton therein. The upper region of cotton compacting chamber 22 of module builder 12 is enclosed by a roof 32 which can also include openings or perforations for the passage of air but not significant amounts of cotton therethrough. The side walls, as represented by side wall 30, each include a vertical forward slot 34 adjacent front end wall 26, and a vertical rearward slot 36 adjacent rear end wall 28, slots 34 and 36 extending substantially the entire vertical height of the compacting chamber.

Compactor structure 14 of module builder 12 includes a compactor frame 38 which is generally horizontal and substantially entirely disposed within cotton compacting chamber 22, for movement downwardly against cotton contained therein for compacting the cotton against floor 24. Compactor frame 38 includes a front cross member 40 disposed in chamber 22 adjacent front end wall 26, having opposite ends which extend through slots 34. Similarly, a rear cross member 42 is disposed in chamber 22 adjacent rear end wall 28 and has opposite ends extending through slots 36.

Compactor frame 38 of compactor apparatus 14 is supported in compacting chamber 22 on each side by an exterior side structure 44, each structure 44 including a substantially horizontal, forwardly and rearwardly extending main beam 46 which extends between and connects front and rear cross members 40 and 42. Each side structure 44 additionally includes a pair of braces 48 which extend downwardly and at converging angles from front and rear cross members 40 and 42, and which are connected together by a gusset 50 located spacedly below about the middle of main beam 46. Here, it should be noted that compactor frame 38 (FIG. 4) located within compacting chamber 22 and exterior side structures 44 on the exterior of the side walls represented by side wall 30 are movable upwardly and downwardly together.

The upward and downward movement of exterior side structures 44 and compactor frame 38 is preferably achieved and controlled by drivers 52 extending, respectively, between gusset 50 of each exterior side structure 44 and a support frame 54 supported by and extending upwardly from a frame 56 of module builder 12. Drivers 52 each preferably comprise a fluid cylinder 58 which receives fluid under pressure from a suitable pressurized fluid source, such as a fluid pump (not shown) of machine 10, for moving exterior fluid structure 44, and thus compactor frame 38 of compactor structure 14, upwardly and downwardly as required or desired for performing a cotton distributing and/or compacting operation. Each fluid cylinder 58 is connected to support frame 54 and includes a rod 60 connected to gusset 50 of exterior side structure 44. In FIG. 1, rod 60 is shown in a retracted position in cylinder 58 such that exterior side structure 44 and compactor frame 38 are located at an elevated or raised position. FIG. 2 shows rod 60 extended to a substantially extended position, to position side structure 44 and compactor frame 38 at a lowered position, representing about a maximum compacting position of compactor structure 14. Here, it should be noted that compactor structure 14 can be supported and driven by a wide variety of alternative apparatus other than that just disclosed, such as, but not limited to, apparatus including a greater or lesser number of drivers disposed in different positions in connection with the compactor structure. In regard to the next discussion, it should also be noted that the basic shape and/or dimensions of the cotton module builder or packager with which compactor structure is used can vary from that disclosed herein.

Generally, a cotton module built using module builder 12 will have a generally rectangular or four sided shape when viewed from above which will have a longitudinal extend of about 14 to 18 feet, a transverse extent of from about 6 to 9 feet, and a height of up to about 9 feet. The shape when viewed from above and the longitudinal and transverse dimensions of the module are determined by the corresponding dimensions of cotton compacting chamber 22. Importantly, the cotton modules, as represented by cotton module 62 shown in FIGS. 10 and 11, will have a top surface 64 having a crown 66 at about the center thereof, preferably extending longitudinally in the forward and rearward direction. Top surface 64 will slope downwardly from crown 66 to opposite longitudinally extending side peripheral edges 68 at an angle sufficiently steep such that the module, at least when covered with a fabric or film cover, will be capable of shedding moisture, such as rain water and dew. The height and shape of top surface 64 are preferably consistent from the forward to rearward end, and the sloped portions of top surface 64 can be curved or straight.

As noted above, during the harvesting operation, cotton is conveyed by air flows through ducts 20 into chamber 22. The cotton is discharged into an upper region 70 of chamber 22, above compactor structure 14. The cotton must then pass or be conveyed downwardly through compactor structure 14 into the lower region 72 of chamber 22, below compactor structure 14. Additionally, the cotton may not be evenly distributed either forwardly and rearwardly or side to side within upper region 70, and the amount and density of the cotton within region 70 can vary widely, depending on such factors as harvesting rate and the amount of compacting actions done by compactor structure 14 within chamber 22. In this latter regard, the compacting actions can include at times lowering compactor structure 14 and activating augers thereon for distributing the cotton more evenly within lower region 72, and at times driving compactor structure 14 downwardly against the cotton to compress and compact it within lower region 72 and against floor 24. Thus, compactor structure 14 functions to transfer or convey the cotton from upper region 70 to lower region 72; to distribute the cotton more evenly or in a desired manner within lower region 72; and to compact the cotton in lower region 72 into the compacted cotton module as represented by module 62, including so as to have a top surface 64 including a crown 66 extending the length of the middle thereof.

Figure 4:
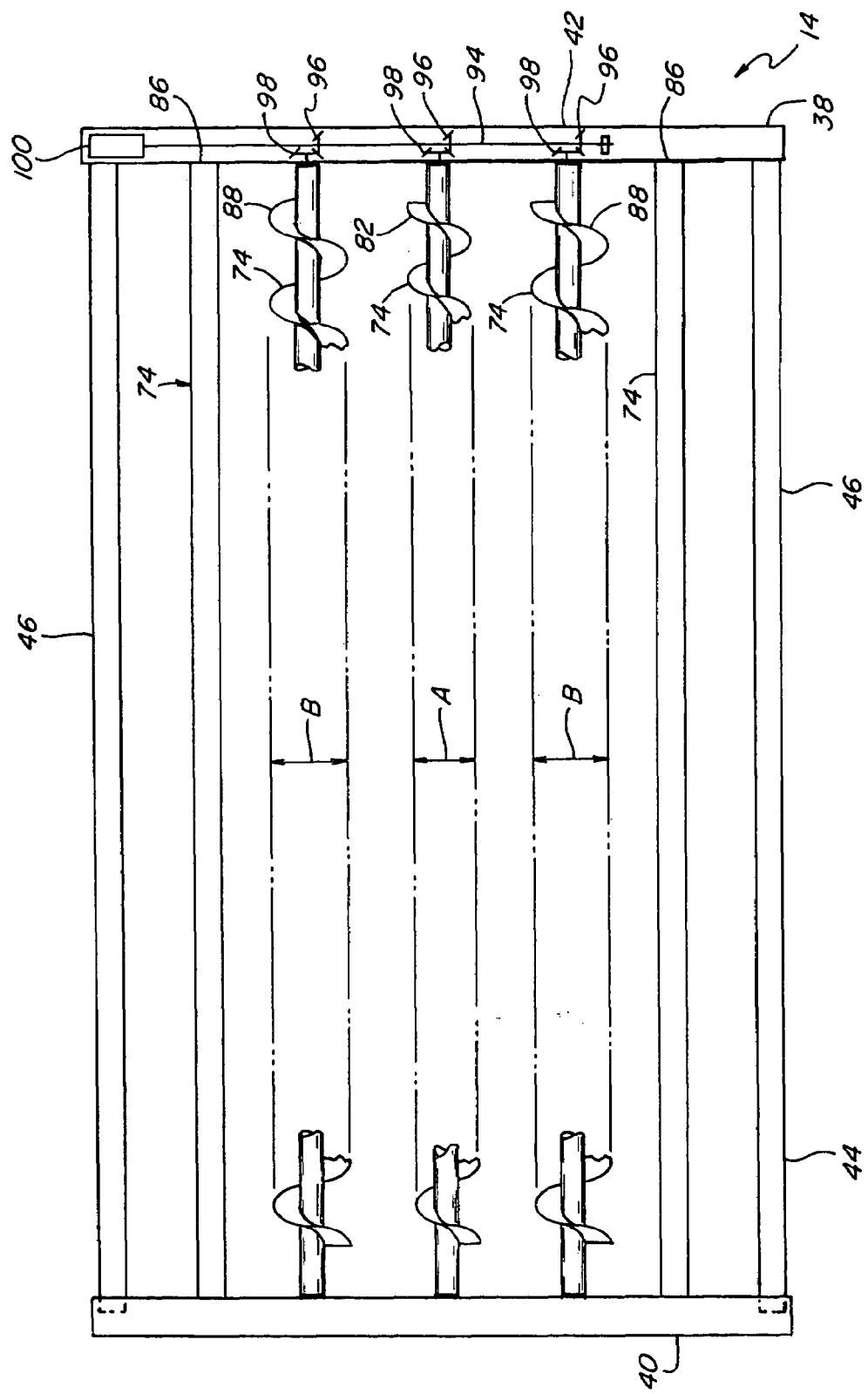
FIG. 4 is a top view of the compactor structure of FIG. 1, showing cotton compactor members thereof for forming the crown on the module.

Referring also to FIGS. 4 and 5, one embodiment of a compactor structure 14 is shown including features for performing the functions set forth above. FIGS. 6 and 7 show alternative embodiments of compactor structure 14 including features for performing the functions. Each of the embodiments of compactor structure 14 includes a plurality or array 74 of elongate cotton compactor members extending between front cross member 40 and rear cross member 42 at spaced locations between main beams 46. The compactor members or array 74 each include a lower cotton contacting portion 76 for pressing against the cotton in lower region 72 for compacting it when structure 14 is driven downwardly by drivers 52 thereagainst. Referring more particularly to FIGS. 5, 6 and 7, the cotton compacting portions 76 are arranged in a concave array represented by curve line 78, to define a longitudinally extending, downwardly facing cavity 80 represented by line 78, for forming crown 66 and the sloped shape on top surface 64 of a cotton module 62 as it is being compacted, as will be explained.

In FIGS. 4 and 5, array 74 of compactor members includes at least one centrally located longitudinally extending auger 82 rotatable about an axis of rotation 84 extending longitudinally therethrough; opposite side compactor members which comprise longitudinally extending beams 86; and intermediate compactor members which comprise longitudinally extending augers 88 disposed both horizontally and vertically between center auger 82 and beams 86, and rotatable about a rotational axis 90, respectively. Center auger 82 includes a helical flight having a diametrical extent A, and intermediate augers 88 each include a helical flight having a diametrical extent B, diametrical extent B being sufficiently larger than extent A, such that rotational axes 84 and 90 are coplanar, as represented by line 92. As a non-limiting example, extent A can be from about 5 to 8 inches and extent B can be about 7 to 12 inches, the lower portion of the range of extent A being used with the lower range of extent B, such that the sufficient difference is present to form the crown and downward slopes suitable for shedding moisture. A principal advantage here is the easier ability to drive augers 82 and 88 using a common input drive, represented by shaft 94 in FIG. 4, for instance, using bevel gears 96 enmeshed with bevel gears 98 on augers 82 and 88 while still maintaining a suitable concave shape denoted by line 78. Input shaft 94 can be rotatably driven by any suitable drive such as a fluid motor 100, an electric motor, or the like as desired. Use of a common drive is also advantageous as it coordinates or synchronizes the speeds of augers 82 and 88. Alternatively, augers 82 and 88 can be individually driven, such as using individual drivers such as fluid motors 100 connected directly to the shafts or through a gear arrangement (not shown).

In FIG. 6, array 74 of cotton compactor members includes at least one centrally located longitudinally extending compactor member which comprises an auger 102 rotatable about an axis of rotation 84 extending longitudinally therethrough; opposite side compactor members which comprise longitudinally extending beams 86; and intermediate compactor members which comprise additional longitudinally extending augers 102 disposed horizontally and vertically between center auger 102 and beams 86, and rotatable about a rotational axis 104, respectively. Augers 102 each include a helical flight having a diametrical extent C, the diametrical extents preferably being about equal. As can be observed, the center one of augers 102 is elevated relative to the intermediate augers 102, such that cavity 80 will have a suitable concave shape, as denoted by line 78, for forming a top surface 64 having a center crown 66 and downwardly sloping portions, as before. Here, an advantage is that because the diametrical extent C of augers 102 is equal, they can be interchangeable. It can also be easier to effect about equal cotton distribution by the respective augers, as will be explained. Augers 102 can be commonly driven, or independently driven, as desired.

In FIG. 7, compactor structure 14 is shown including an array 74 of compactor members including a centrally located beam 86 in place of an auger, and also side beams 86. Intermediate augers 88 rotatable about axis 90 are located at about the same intermediate positions as augers 88 of the embodiment shown in FIGS. 4 and 5. Augers 88 in this embodiment can be driven by a common drive, or separately, as desired.

Figure 8:
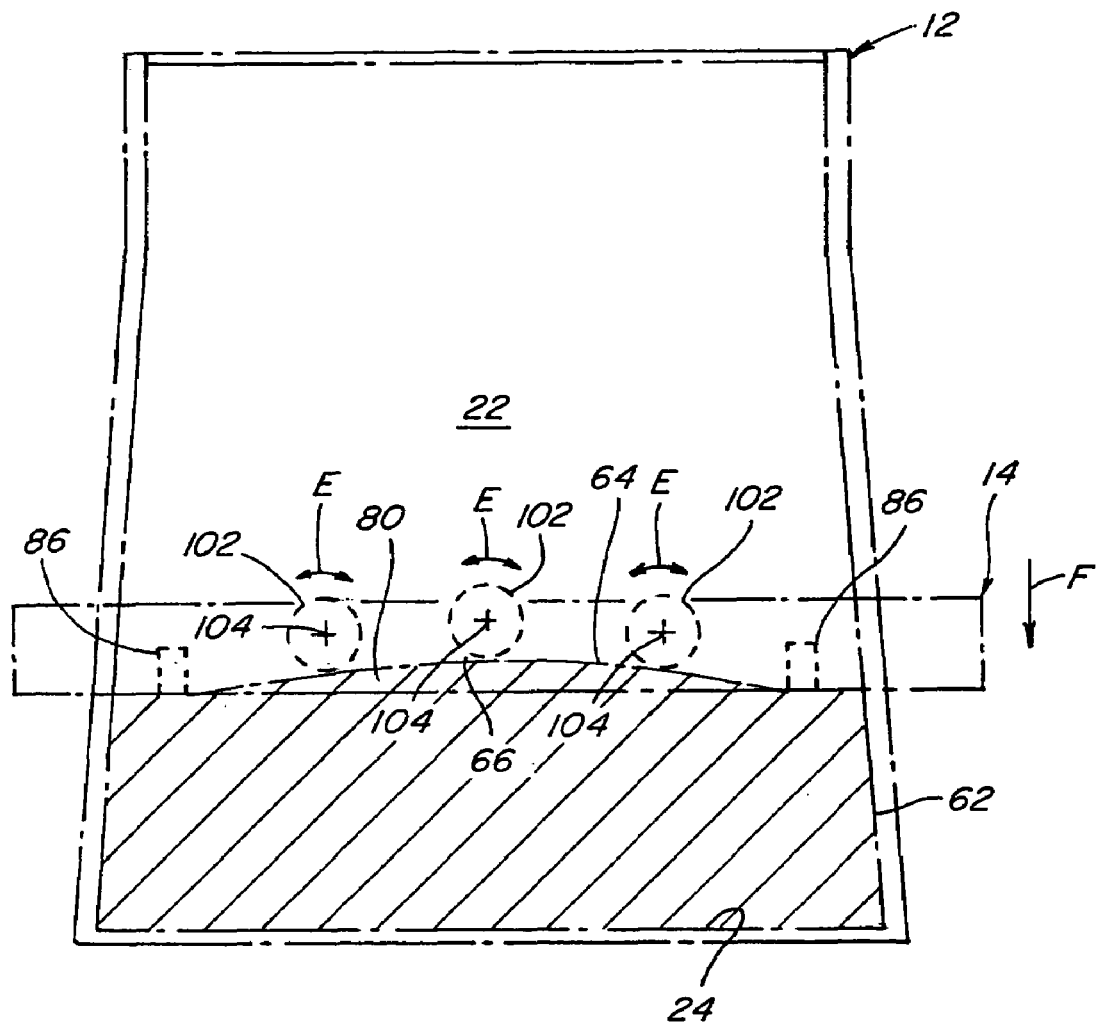
FIG. 8 is a simplified schematic end view of the cotton module builder of FIG. 1, showing the compactor structure of the invention in a lowered position compacting cotton in a bottom region of the module builder.

Referring also to FIGS. 8, 9, 10, and 11, steps for building a compacted cotton module, represented by module 62, and including a crown 66 extending longitudinally along about the center of a top surface 64, will be described. In FIG. 8, compactor structure 14 is shown at a lowered position within cotton compacting chamber 22 of compactor structure 14 for distributing and compacting the cotton against floor 24 of module builder 12. Here, it should be understood that compactor structure 14 can be lowered by drivers 52 (FIGS. 1 and 2) so as to contact the cotton collected on floor 24 without exerting a downward force thereagainst as noted by arrow F sufficient for significantly compacting the cotton. The augers, here represented by augers 102 of the embodiment of FIG. 6, can be rotated about respective rotational axis 104 in a desired or required direction, as denoted by arrows E, for distributing the cotton substantially evenly in the longitudinal direction. Compactor structure 14 can also, or alternatively, be driven with a compacting force downwardly against the cotton by drivers 52, to compact the cotton into concave cavity 80 and so as to form the desired top surface 64 having a longitudinally extending, central crown 66 and downward slopes to side beams 86. Here, it should be noted that these steps can be repeated as desired or required at different elevations within chamber 22 as incoming cotton is incorporated and formed into module 62.

Figure 9:
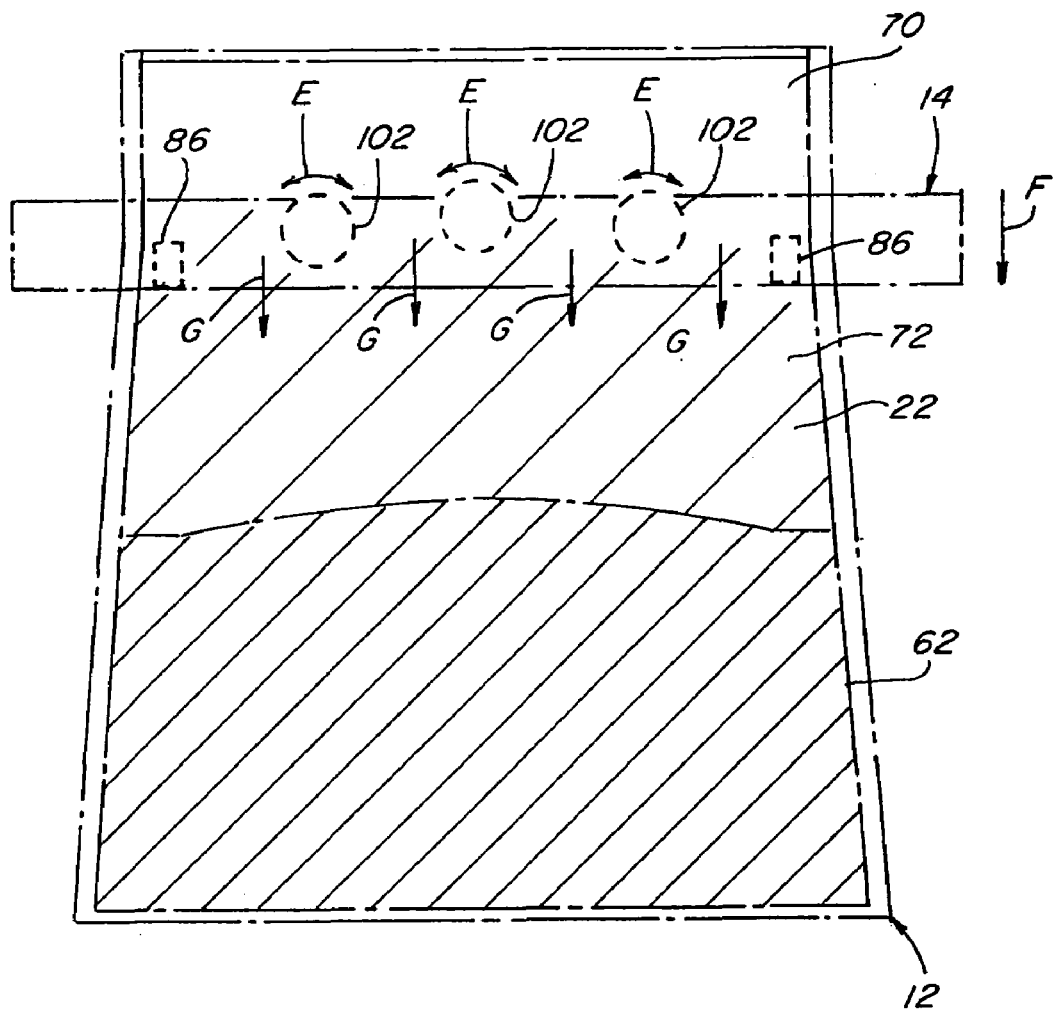
FIG. 9 is another simplified schematic end view of the cotton module builder of FIG. 1, showing the compactor structure of the invention in the uppermost position, and illustrating rotation of augers of the compactor structure for distributing cotton within an upper region of the module builder.

In FIG. 9, partially completed module 62 is located in the lower region of chamber 22 and compactor structure 14 is located a spaced distance thereabove, with augers 102 being rotated, as denoted by arrows E, for distributing loose cotton (represented by wider cross hatched region) over partially formed module 62 (narrower cross hatched) as required for forming the desired shape, and also for conveying incoming and other cotton from upper region 70 of chamber 22 downwardly between augers 102 and beams 86 into lower region 72, denoted by arrows G, for integration into module 62, when compactor structure 14 is driven downwardly, as denoted by arrow F.

Figure 10:
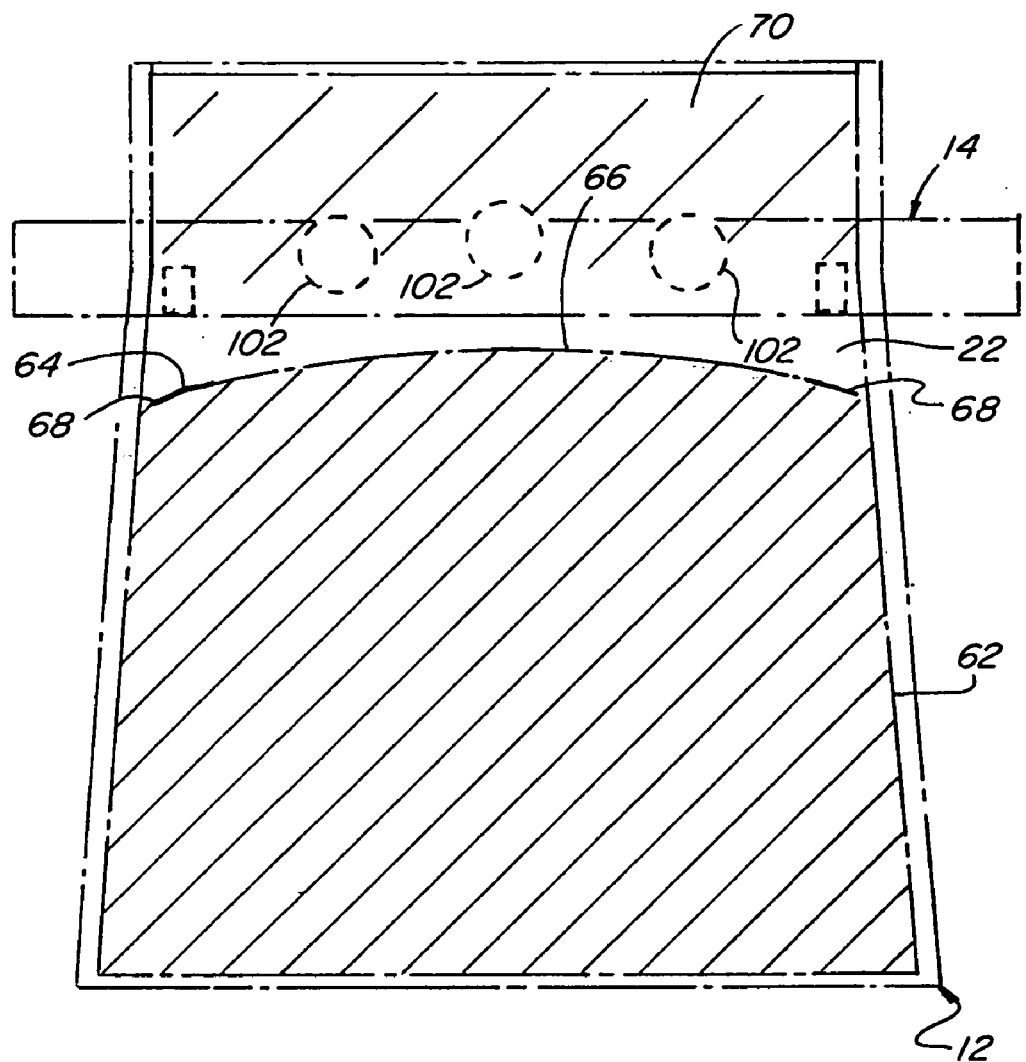
FIG. 10 is another simplified schematic end view of the cotton module builder of FIG. 1, showing the compactor structure of the invention in the uppermost position holding cotton above a completed cotton module.

Referring also to FIG. 10, compactor structure 14 is shown in a raised position above a completed compacted cotton module 62, module 62 including a top surface 64 having a center crown 66 and a shape which slopes downwardly therefrom toward peripheral edges 68, along the longitudinal extent of module 62. Loose cotton (represented by wider cross hatching) is located and accumulating in upper region 70 of chamber 22. By not rotating augers 102, at least a substantial portion of the incoming cotton will be retained in upper regions 70, to allow unloading of the completed cotton module 62, as shown in FIG. 11.

Here, it should be noted that during the harvesting operation, as cotton is delivered into upper region 70, the augers cab be continuously operating, so as to continuously convey the cotton into the lower region of the chamber and such that the cotton will not collect to a significant extent in the upper region. During such auger operation, the speed and direction of rotation can be varied or alternated as desired or required for obtaining a desired distribution of the cotton in the lower region of the chamber. Then, at times, as required, the compactor structure can be lowered with the augers rotating to distribute the collected cotton in a desired or required manner, and the rotation can be stopped as the compactor structure is driven downwardly against the cotton to compact it.

Figure 11:
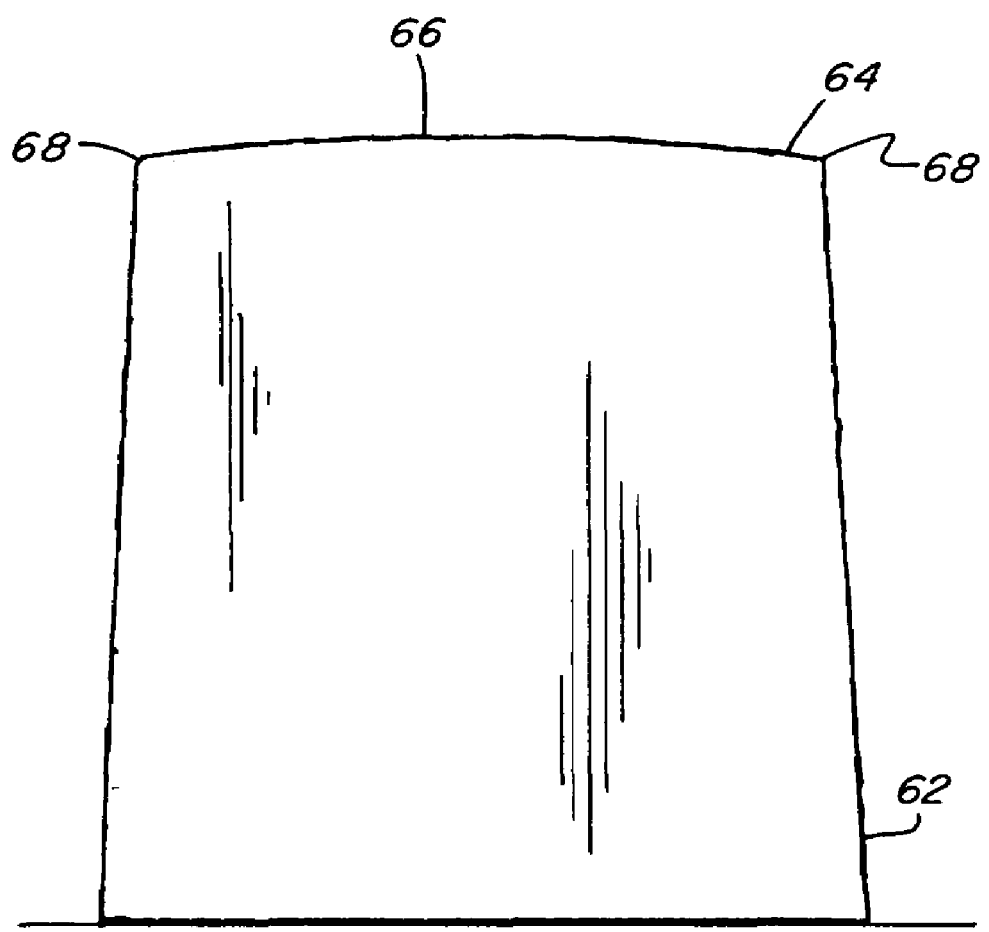
FIG. 11 is an end view of a free standing cotton module built in the module builder of FIG. 1, showing the crown of the top surface of the module.

Referring also to FIG. 11, completed cotton module 62 is shown removed from chamber 22, the module having been compacted sufficiently so as to be freestanding, and so as to retain top surface 64 having centrally located longitudinally extending crown 66, and slopes extending downwardly to peripheral edges 68. Module 62 will be sufficiently densely compacted and the crown and slope will be such that moisture will not accumulate thereon. Module 62 is now ready to be covered.

Here, in reference to FIGS. 8, 9 and 10, cotton module builder 12 can longitudinally extending opposite side walls which extend divergingly in the downward direction, such that a completed cotton module such as module 62 will have correspondingly tapered side walls. It should also be noted that side beams 86 of compactor structure 14 are positioned so as to be in close proximity to the side walls, respectively, when module 62 is at and near its complete or maximum height, as best shown in FIGS. 9 and 10, such that the cotton will be compacted and shaped between the side walls and beams to form the longitudinally extending side peripheral edges 68. It should be further noted that it is anticipated that a completed cotton module will be unloaded from module builder 12 by tilting module builder 12 such that the forward end thereof is raised relative to the rearward end, and that the module will be conveyed over a folding door apparatus 106 (FIG. 1). As a result, it is desirable to retain cotton within upper region 70, with only a minimal amount of the cotton inadvertently being allowed to pass or fall downwardly through compactor structure 14 onto the completed module, or into the empty chamber so as to possibly fall or pass from the chamber. Thus, in regard to the spacing between the compactor members of compactor structure 14, such spacing should be sufficiently adequate for passage of cotton therethrough when the augers are rotating, but sufficiently small such that cotton can be largely retained by the augers thereabove after completion of a cotton module. As a result, less cotton will be likely to be lost and only a small amount of loose cotton will be present on the top of the module, such that a cover placed on the module will fit snuggly in conformance to the top surface and have few depressions or irregularities where moisture can collect. Because the size and shape of the top surface of the module can be closely controlled as a result of the present invention, covers can be more precisely made to the same size and shape, such that there is less likelihood of wind getting under a loose cover and lifting and fully or partially removing it or damaging it or the underlying cotton.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. Apparatus for distributing and compacting cotton within a cotton compactor chamber, comprising:
a frame adapted to be supported in the chamber for downward movement against cotton collected in a lower portion of the chamber for compacting the cotton therein into a cotton module, the frame including a plurality of elongate cotton compactor members disposed in a longitudinally extending concave array defining a downwardly facing cavity, the cotton compactor members including at least one center compactor member defining a longitudinally extending highest region of the cavity and compactor members spaced from the center compactor member defining lower regions of the cavity, at least some of the cotton compactor members comprising augers rotatable for moving cotton downwardly through the frame and in at least one longitudinal direction beneath the frame.

2. The apparatus of claim 1, wherein the center compactor member comprises a beam.

3. The apparatus of claim 1, wherein the center compactor member comprises one of the augers.

4. The apparatus of claim 3, wherein the augers are each rotatable about a longitudinally extending axis of rotation, the axes of rotation being aligned along a generally horizontal line transverse to the longitudinal direction, and the auger of the center compactor member having a diametrical extent which is less than diametrical extent of others of the augers.

5. The apparatus of claim 1, wherein the compactor members spaced from the center compactor member include side compactor members defining opposite lowermost side peripheral edges of the cavity.

6. The apparatus of claim 5, wherein the compactor members additionally include intermediate compactor members comprising augers disposed between the center compactor member and the side compactor members, respectively.

7. The apparatus of claim 6, wherein the augers are sufficiently close to adjacent ones of the compactor members so as to be capable of holding cotton therebetween, and such that when rotated the augers will convey the cotton held thereby downwardly into the compactor chamber below the frame.

8. Apparatus for distributing and compacting cotton for forming a compacted cotton module in a cotton compactor chamber, comprising:
a frame adapted to be supported in the compactor chamber for downward compacting movement against cotton collected in a bottom portion of the chamber, the frame including generally parallel, elongate side compactor members extending in a predetermined direction and adapted for extending along opposite sides of the chamber, respectively, the side compactor members defining a space therebetween extending in the predetermined direction and including lower portions for pressing against cotton therebelow during the downward compacting movement for compacting the cotton to form peripheral edges of a top surface of the cotton module, at least one elongate center compactor member extending in the predetermined direction through a center portion of the space, the center compactor member having lower portions at a predetermined elevation above the lower portions of the side compactor members for pressing against cotton below the center member during the downward compacting movement for compacting the cotton to form a center crown along the top surface of the cotton module at about the predetermined elevation above the peripheral edges, and elongate intermediate compactor members extending in the predetermined direction through the space between one of the side compactor members and the center compactor member, respectively, each of the intermediate compactor members having lower portions at an elevation between the lower portions of said side compactor member and the lower portions of the center compactor member for pressing against cotton below the intermediate member during the downward compacting movement for compacting the cotton into intermediate regions of the top surface of the cotton module which slope downwardly from the crown to the peripheral edges of the top surface, respectively, and at least the intermediate compactor members including augers rotatable for moving cotton downwardly through the frame and along the frame in the predetermined direction.

9. The apparatus of claim 8, wherein the center compactor member comprises a beam.

10. The apparatus of claim 8, wherein the center compactor member includes an auger.

11. The apparatus of claim 10, wherein the augers are each rotatable about a longitudinally extending axis of rotation, the axes of rotation of the augers being at least generally coplanar, and the auger of the center compactor member having a diametrical extent which is less than diametrical extents of the augers of the intermediate compactor members so as to position the lower portions of the center compactor member at the predetermined elevation above the lower portions of the side compactor members.

12. Apparatus for distributing and compacting cotton within a cotton compactor chamber for forming a compacted module of cotton including a top surface which slopes downwardly in opposite directions from a center portion to opposing side edge portions, comprising:

a frame adapted to be supported in the compactor chamber for downward compacting movement against cotton collected in a bottom portion of the chamber, the frame including generally parallel, elongate side compactor members extending in a predetermined direction and adapted for extending along opposite sides of the chamber, respectively, the side compactor members defining a space therebetween extending in the predetermined direction, and the side compactor members including lower portions for pressing against cotton therebelow during the downward compacting movement for compacting the cotton to form the side peripheral edges of the top surface of the cotton module, at least one elongate center compactor member extending in the predetermined direction through about a center portion of the space, the center compactor member having lower portions at an elevation a predetermined distance above the lower portions of the side compactor members for pressing against cotton in a center region of the chamber during the downward compacting movement for compacting the cotton in the center region to form a center crown along the top surface of the cotton module which is about the predetermined distance higher than the peripheral edge portions, and elongate intermediate compactor members extending in the predetermined direction through the space between one of the side compactor members and the center compactor member, respectively, each of the intermediate compactor members having lower portions at an elevation between the lower portions of said side compactor member and the lower portions of the center compactor member for pressing against cotton beneath the intermediate compactor member during the downward compacting movement for compacting the cotton so as to slope downwardly from the crown to the peripheral edge of the top surface, and at least the intermediate compactor members comprising augers rotatable for moving cotton downwardly through the frame and along the frame in the predetermined direction.

13. The apparatus of claim 12, wherein the center compactor member comprises a beam.

14. The apparatus of claim 12, wherein the center compactor member includes an auger.

15. The apparatus of claim 14, wherein the augers are each rotatable about an axis of rotation extending in the predetermined direction, the axes of rotation of the augers being at least generally coplanar, and the auger of the center compactor member having a diametrical extent which is less than diametrical extents of the augers of the intermediate compactor members so as to position the lower portions of the center compactor member at the predetermined distance above the lower portions of the side compactor members.

16. Apparatus for distributing and compacting cotton within a cotton compactor chamber, comprising:

a frame adapted to be supported in an upper region of the chamber for downward movement toward cotton collected in a lower portion of the chamber, the frame supporting a plurality of elongate augers disposed in a longitudinally extending concave array defining a downwardly facing cavity, the augers including at least one center auger defining a longitudinally extending highest region of the cavity and augers spaced from the center auger defining lower regions of the cavity.

17. The apparatus of claim 16, wherein the augers are each rotatable about a longitudinally extending axis of rotation, the axes of rotation being aligned along a generally horizontal line transverse to the longitudinal direction, and the center auger having a diametrical extent which is less than diametrical extent of others of the augers.

18. The apparatus of claim 16, wherein adjacent ones of the augers are sufficiently close together so as to be capable of holding cotton therebetween, and such that when rotated the augers will convey the cotton held thereby downwardly into the compactor chamber.

* * * * *